July 24, 1956  I. M. DAVIDSON  2,756,008
JET PROPELLED AIRCRAFT WITH WING-MOUNTED JET ENGINES
Filed April 7, 1954  3 Sheets-Sheet 1

July 24, 1956     I. M. DAVIDSON     2,756,008
JET PROPELLED AIRCRAFT WITH WING-MOUNTED JET ENGINES
Filed April 7, 1954     3 Sheets-Sheet 2

Inventor
Ivor Macaulay Davidson
By
Stevens, Davis, Miller & Mosher
Attorneys

# United States Patent Office 2,756,008
Patented July 24, 1956

2,756,008

JET PROPELLED AIRCRAFT WITH WING-MOUNTED JET ENGINES

Ivor Macaulay Davidson, Farnborough, England, assignor to Power Jets (Research and Development) Limited, London, England, a British company Application April 7, 1954, Serial No. 421,539

Claims priority, application Great Britain April 8, 1953

6 Claims. (Cl. 244—15)

This invention relates to a jet propelled wing of an aircraft—i. e. a lifting element propelled by the reaction of a jet of gas leaving the element.

According to the invention the propulsive jet is emitted by a number of jet engines housed inside the rear part of the wing immediately behind a rear main spar or bulkhead to which the engines are attached, the engines discharging through a series of contiguous nozzles forming a long shallow nozzle extending along the rear part of the wing, usually in or near to the trailing edge.

The invention is illustrated by the accompanying drawings of which—

Figure 1:
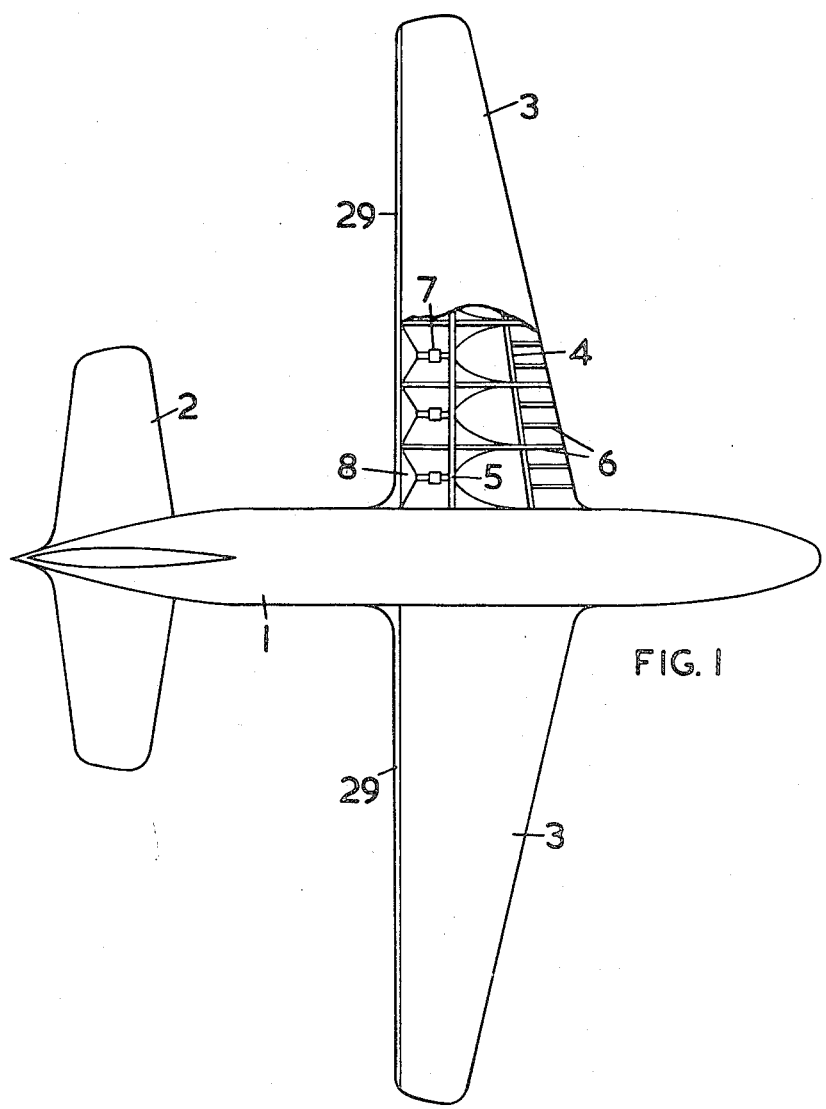
Fig. 1 is a general view of an aircraft incorporating the invention.
Figure 2:
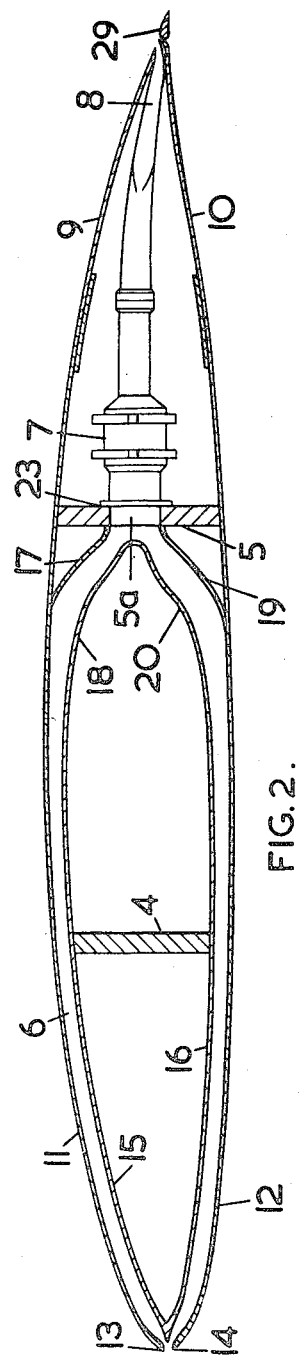
Fig. 2 is a cross section of the wing of Fig. 1.
Figure 3:
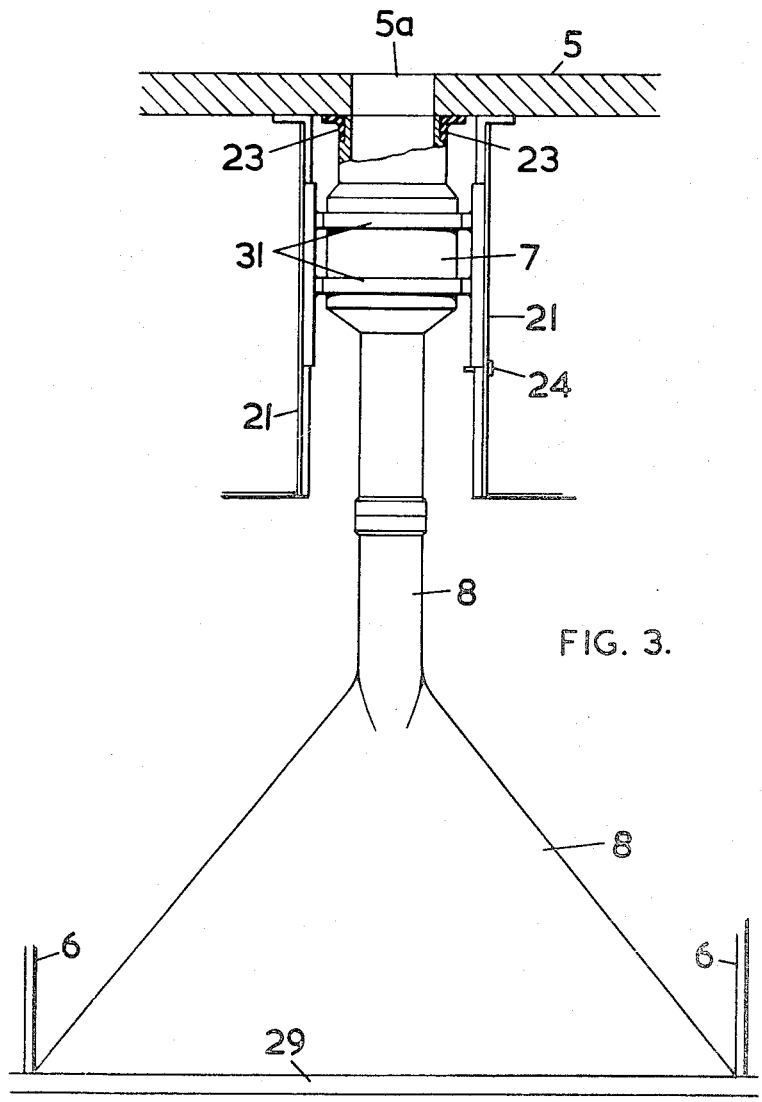
Fig. 3 is an enlarged detail in plan, showing the engine mounting.

In Fig. 1 the aircraft comprises a fuselage 1, a tailplane 2, and wings 3 of which the structure includes a front main spar 4, a rear main spar 5 and such other spanwise and chordwise structural elements as usually make up a wing. Referring also to Figs. 2 and 3, there is a number of jet engines 7 housed inside the wing immediately behind the rear main spar 5, for emitting jets through a series of contiguous flattened nozzles 8 which combine to form a long shallow jet nozzle along the trailing edge of the wing. As shown in Fig. 1 the nozzle extends as nearly as possible from wing-tip to wing-tip except where interrupted by the fuselage 1. Fairings 9 and 10 over and under the engines, at least one being detachable, constitute the trailing surfaces of the wings. The engines 7 are pushed into the channel exposed when either of these fairings is removed, each engine being separately attached, as described hereinafter, so that each can be readily detached and independently withdrawn for inspection or repair and readily replaced.

The term "engine" is used to mean a complete jet-propulsion power unit, possibly with auxiliaries for one or more engines, and a jet pipe terminating in a jet nozzle; for example the engine may be a gas turbine unit including a turbine, a compressor driven thereby, and a combustion system, with fuel injection and ignition members and perhaps with a fuel pump and other auxiliaries.

The fairings 9 and 10 are detachable rearward parts of the outer skin members 11 and 12 of the wing. Each engine has its intake duct leading thereto through the wing as shown in Fig. 1 from part of a long shallow inlet opening extending preferably along substantially the whole wing span in the neighbourhood of the leading edge of the wing 3; this is a diffusing inlet formed between the shaped leading-edge members 13 and 14 in Fig. 1. Each intake duct is in a hollow wall formed by the upper outer skin 11 and an inner stiffening plate 15 attached to the spar 4 and spaced from the outer skin by stiffeners 6. The latter divide the incoming air into separate inlet paths for individual engines or groups of engines. Walls 17 and 18 extend the inlet ducts up to central inlet openings 5a through the spar 5 into the engine intakes. Additionally or alternatively, unless they cannot be accommodated because of space required for retracted undercarriages, similar inlet ducts are provided by the lower skin 12 and walls 16, 19 and 20.

The spar 5 carries each engine by rails 21 secured thereto (Fig. 3) supporting cradles 31 fastened around the engines. Each engine abuts against the spar, with its inlet aligned with a hole 5a in the spar and carries disengageably a sealing flange 23 of flexible or rubbery material which will of course engage tightly under working conditions, due to the reduction of internal pressure by the engine inlet suction. The usual disengageable pipe couplings and electrical couplings are provided for connection to the engines. Each engine is retained by one or more pins 24 engaging the cradle 31 and rail 21 and accessible from the rear of the engine. If necessary, access may be had to the pins 24 and the couplings through normally covered hand holes in the skins 11 and 12.

Each engine 7 has its jet pipe decreasing in depth and increasing in width so as to change progressively from circular section, and terminate in the elongated shallow nozzle 8, usually symmetrical with respect to the engine; however, in engines adjacent to the wing tips, which engines may have to be displaced somewhat towards the fuselage to allow for reduction of wing thickness at the tip, the nozzles may be unsymmetrically disposed. Engines adjacent to the fuselage 1 may in some cases discharge through nozzles extending under the fuselage to give as nearly as possible an uninterrupted nozzle slot from wing-tip to wing-tip.

It will be seen that the invention provides a simple construction for discharging the jet as a long shallow sheet extending along the trailing edge of the wing, by means of a number of comparatively small engines, readily with-drawable and replaceable, and may provide also a construction wherein the engines form the trailing part of the wing and their intake ducts form an integral part of the structure of the wing.

For deflecting the sheet jet upwards and downwards the nozzle terminates in a jet deflector 29 shown in the form of a wing flap hinged in conventional manner to the rear of the wing.

I claim:

1. An aircraft, a jet propelled wing therein, the structure of said wing including a spanwise-extending rear main spar, and a plurality of jet engines removably housed in the rear of the wing behind and supported by said rear spar, with their jet nozzles contiguous to form a long shallow nozzle extending along the rear part of the wing.

2. An aircraft according to claim 1 wherein the trailing part of the wing is formed by fairings above and below the engines, of which at least one is detachable, and fastening means for each engine permitting each to be separately detached and rearwardly separated from the said main spar.

3. An aircraft according to claim 2 wherein said long shallow nozzle extends along a major part of the wing span.

4. An aircraft according to claim 1 wherein each of said engines has a jet pipe which is of varying cross-section and which terminates at its rear in a long shallow jet nozzle proportioned to emit a jet in the form of a thin sheet.

5. An aircraft according to claim 1 including a long shallow air inlet slot extending along the major part of the leading edge of said wing and air passages in the wing extending from said inlet to said jet engines.

6. An aircraft according to claim 5 wherein said inlet slot extends as nearly as possible from wing-tip to wing-tip.

(References on following page)

References Cited in the file of this patent

UNITED STATES PATENTS

| | | |
|---|---|---|
| 2,580,339 | Woodward | Dec. 25, 1951 |
| 2,589,732 | Riviere | Mar. 18, 1952 |

FOREIGN PATENTS

| | | |
|---|---|---|
| 694,497 | France | Sept. 16, 1930 |
| 971,992 | France | Jan. 9, 1952 |
| | (1st Addition 55,362) | |